United States Patent Office 3,575,831

Patented Apr. 20, 1971

3,575,831

PROCESS FOR THE PRODUCTION OF VITAMIN D

Karlheinz Pfoertner, Basel, Switzerland, assignor to Hoffmann-La Roche Inc., Nutley, N.J.

No Drawing. Filed May 22, 1968, Ser. No. 731,262
Claims priority, application Switzerland, May 31, 1967, 7,703/67
Int. Cl. B01j *1/10;* C07g *13/00*
U.S. Cl. 204—159 16 Claims

ABSTRACT OF THE DISCLOSURE

A process for converting provitamin D into vitamin D by irradiation with ultraviolet light of the wave length of 253.7 mμ. at temperatures of at least 50° C.

BACKGROUND OF THE INVENTION

In the past provitamin D was transformed into a mixture of previtamin D and vitamin D by irradiation at temperatures below room temperature and utilizing ultraviolet light having a wave length of above 270 mμ. The previtamin D in this mixture was then easily converted to vitamin D by heating. This process has suffered from many disadvantages. One of these disadvantages is due to the fact that high pressure mercury lamps are necessary to produce ultraviolet light having a wave length of above 270 mμ. The photochemically active light produced by high pressure mercury burners which is very necessary to convert provitamin D into this mixture is very small (below 2%) in relation to the electrical power absorbed. Therefore, in order to prevent side reactions from occurring, light of wave lengths which are unfavorable to this reaction had to be filtered out. This has proven to be a costly and inefficient procedure.

Furthermore, the mixture produced by this process is in the form of a resin which is yellow to brown in color. In order to provide a commercially acceptable product from this resin, it has been necessary to utilize a long and cumbersome work-up procedure.

SUMMARY OF THE INVENTION

In accordance with this invention, it has been discovered that when provitamin D is irradiated with ultraviolet light of the wave length of about 253.7 mμ at temperatures of from about 50° C. to 120° C., a product containing vitamin D, previtamin D, provitamin D (unreacted starting material), and small amounts of tachysterol is produced in the form of a white, crystalline product. Therefore, by means of the process of this invention, the work-up procedure necessary to convert the yellow to brown resin product to a white, crystalline product is eliminated. Furthermore, the process of this invention can be carried out utilizing a low pressure mercury lamp. This lamp transforms up to 90% of the electrical power absorbed into ultraviolet light of the desired wave length. Therefore, by means of the process of this invention, it is unnecessary to utilize light filters to remove light of wave lengths which are unfavorable to the production of vitamin D from provitamin D. Hence, the process of this invention provides a simple and economic process of converting provitamin D to vitamin D.

DETAILED DESCRIPTION

Provitamin D includes ergosterol (provitamin $D_2$) and 7-dehydrocholesterol (provitamin $D_3$). If ergosterol is treated in accordance with the process of this invention, a pure crystalline product composed of previtamin $D_2$, vitamin $D_2$, provitamin $D_2$ and a small amount of tachysterol is produced. On the other hand, if 7-dehydrocholesterol is used as the starting material in the process of this invention, a white crystalline product composed of previtamin $D_3$, vitamin $D_3$, provitamin $D_3$ and tachysterol is produced.

Previtamin D includes previtamin $D_2$ or previtamin $D_3$, i.e., compounds having the formula:

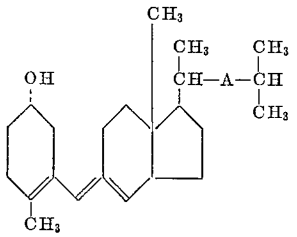

I wherein A is $$-CH{=}CH-\underset{|}{\overset{CH_3}{C}}H-$$

or $—CH_2—CH_2—CH_2$.

When A is $$-CH{=}CH-\underset{|}{\overset{CH_3}{C}}H-$$

the compound of Formula I is previtamin $D_2$.

When A is $—CH_2—CH_2—CH_2—$, the compound is previtamin $D_3$.

In carrying out the reaction of this invention, the provitamin D is converted into a white crystalline product composed of a mixture of vitamin D, previtamin D, provitamin D and a small amount of tachysterol. In accordance with this invention, this mixture can be converted to pure white crystalline vitamin D in a simple manner. The unreacted provitamin D can be separated e.g., by dissolving the crystalline product in methanol and crystallizing out the provitamin D by cooling e.g., to —6° C. The tachysterol in the remaining mixture can be separated off according to known conventional procedures such as by reaction with citraconic or maleic acid anhydride. The previtamin D contained in this mixture can be converted into pure crystalline vitamin D by conventional and known methods such as by heating (—refluxing previtamin D in ethanol results in an equilibrium consisting of 81% vitamin D and 19% provitamin D—) and the small amount of previtamin D not converted by heating can be separated from the vitamin D by crystallization.

In carrying out the process of this invention, any conventional source capable of supplying an ultraviolet light of the wave length 253.7 mμ can be utilized. However, it is generally preferred to utilize a low pressure mercury lamp. This is true since this lamp transforms up to 90% of the electrical power absorbed into ultraviolet light of the desired wave length.

In carrying out the reaction in accordance with this invention, temperatures of from about 50° C. to 120° C. are utilized. Generally, it is preferred to carry out this irradiation reaction at a temperature from about 70° C. to 90° C. In carrying out this photo-reaction, pressure is not critical, and atmospheric pressure or elevated pressure can be utilized. However, it is generally preferred to carry out this photo reaction at atmospheric pressure.

In accordance with the present invention, irradiation of provitamin D is effected by dissolving the provitamin D in a solvent. Suitably, the solution will contain from about 0.01% to about 2% of the provitamin D, by weight. In a preferred embodiment, the solution will contain from about 0.1% to about 0.5% of provitamin D on the same basis. The desired concentration of provitamin D will depend upon the particular solvent used.

Among the preferred organic solvents which can be utilized in accordance with this invention are the organic solvents having a low dielectric constant, i.e. those solvents having a dielectric constant of less than 20 DC at 20° C. These solvents having a low polarity or dielectric constant include lower alcohols, simple and cyclic ethers, such as dioxane, aliphatic hydrocarbons, benzene, toluene, o- or p-xylene. Generally, it is preferred to utilize isopropanol, isooctane, benzene, toluene, o- or p-xylene.

In accordance with this invention we have found that solvents such as benzene, toluene, o- or p-xylene which completely absorb the incident light of the wave length 253.7 m$\mu$ can be utilized in carrying out this process. That the process in accordance with this invention is operable even utilizing these solvents which completely absorb the incident light of wave length 253.7 nm. is believed due to the use of elevated temperature and to the action of these solvents as sensitizers.

In carrying out a preferred embodiment of this process, a solution of provitamin D is conveniently irradiated in a circulating apparatus under an inert gas atmosphere with a low pressure mercury lamp. Generally, this reaction is carried out until about 40 to 60% by weight of the provitamin D is converted. The conversion can be ascertained according to known methods such as by means of thin layer chromatography or by mathematical analysis of the U.V. absorption spectrum of the reaction mixture. In order to achieve a high vitamin D content, solution obtained from the photo-reaction can be further held at elevated temperatures until no more diminution of previtamin D is detectable by thin layer chromatography. The unreacted provitamin D can be separated from the reaction product by known methods, such as by crystallization from methanol. The unreacted provitamin D can again be employed in the irradiation process of this ininvention. The vitamin-containing product present after separating off the provitamin D starting material can be used directly as an active substrate. However, in order to obtain a very pure, crystallized vitamin D, the tachysterol obtained in a small amount as by-product can be separated from the reaction product according to known methods such as by reaction with citraconic or maleic acid anhydride, e.g. by adding maleic acid anhydride to a solution of the mixture in benzene (tachysterol/maleic anhydride ratio=1:5), heating at 75° C. for 30 minutes, cooling, adding a 12% solution of potassium hydroxide in diluting with water, extraction with ether, washing the ether extract with water and evaporation under a nitrogen atmosphere, tachysterol remaining in the aqueous phase, whereas previtamin D and vitamin D are obtained on evaporation of the ether phase. Furthermore, the residual previtamin D can be separated from the reaction product by conventional means such as crystallization or column chromatography.

The following examples illustrate the process of this invention. All temperatures are stated in degrees centigrade. All percentages are given in percent by weight.

EXAMPLE 1

Under argon in a circulating apparatus, 1 g. of ergosterol is irradiated in 1 liter of isopropanol at a constantly held temperature listed below for 120 minutes with an 8 watt low pressure mercury lamp. The reaction mixture is subsequently heated at 80° for 120 minutes without irradiation. The solvent is thereafter evaporated off in the nitrogen atmosphere under reduced pressure to leave a dry residue. This residue is dissolved in a small amount of hot methanol and the unreacted starting material (ergosterol) crystallized out at −6°. The vitamin $D_2$, previtamin $D_2$ and tachysterol contents of the reaction mixture are given in the table which appears below.

For the constantly held irradiation temperatures specified in the table, the resulting compositions were obtained:

| | Mixture | |
|---|---|---|
| Irradiation temperature, t° | Vitamin-$D_2$ plus previtamin-$D_2$, percent | Tachysterol, percent |
| 50.5 | 32.9 | 21.6 |
| 60.2 | 37.5 | 14.1 |
| 70.0 | 38.7 | 10.0 |
| 77.2 | 42.6 | 8.5 |

A similar result is obtained when 7-dehydrocholesterol is used as the starting material except the mixture contained vitamin-$D_3$ and previtamin-$D_3$.

EXAMPLE 2

Under argon in a circulating apparatus, 1 g. or 2 g. of 7-dehydrocholesterol are irradiated in 1 liter of isopropanol at a constantly held temperature of 77.3±0.1° with an 8 watt low pressure mercury lamp. The reaction mixture is subsequently heated at 77° for 120 minutes without irradiation. The unreacted starting material is separated off in accordance with the method given in Example 1.

After a conversion of 41% of provitamin, the reaction mixture has the composition given in the following table:

| | Mixture | |
|---|---|---|
| Initial concentration, g./l. | Vitamin-$D_3$ plus previtamin-$D_3$, percent | Tachysterol, percent |
| 1.0 | 35.2 | 5.8 |
| 2.0 | 37.0 | 4.0 |

A similar result is obtained when ergosterol is used as the starting material except that the mixture contained vitamin-$D_3$ and previtamin-$D_3$.

EXAMPLE 3

Under argon in a circulating apparatus, 1 g. of ergosterol is irradiated in 1 liter of the solvent specified hereinafter utilizing a temperature range of 84.7–87.0° with a low pressure mercury lamp. The irradiation was carried out until 45% of the ergosterol was converted. The irradiation times required for this conversion are set forth in the following table. DC in the table is the dielectric constant at 20° C. for the given solvent. The water-n-butanol solvent mixture consisted of 15 parts by volume of water and 85 parts by volume of n-butanol.

| Solvent | DC, 20° | Irradiation time [1] |
|---|---|---|
| n-butanol/$H_2O$ | 27.1 | 90 |
| n-butanol | 17.8 | 82 |
| Isooctane | 1.94 | 73 |

[1] Up to a 45% conversion of ergosterol, minutes.

A similar result is obtained when 7-dehydrocholesterol is used as the starting material.

EXAMPLE 4

Under argon in a circulating apparatus 1 g. of 7-dehydrocholesterol is irradiated in 1 liter of benzene at a temperature of 73° with an 8 watt low pressure mercury lamp. The composition of the reaction mixture as determined by vapor phase chromatography was as follows:

| | Mixture | |
|---|---|---|
| Irradiation time in minutes | Vitamin-$D_3$ and previtamin-$D_3$, percent | Tachysterol, percent |
| 120 | 28.6 | 1.9 |
| 180 | 34.5 | 3.3 |
| 240 | 43.9 | 3.8 |

NOTE.—Balance to 100% = unreacted starting material.

I claim:

1. A process of producing previtamin D from provitamin D comprising irradiating provitamin D with ultraviolet light of a wavelength of about 253.7 mμ at a temperature of from 50° C. to 120° C. to form previtamin D.

2. The process of claim 1 wherein the provitamin D is dissolved in a solvent to form a solution containing from about 0.1% to .5% by weight of provitamin D.

3. The process of claim 2 wherein the solvent has a low polarity.

4. A process for the production of a mixture of vitamin D and previtamin D which process comprises irradiating a solution of provitamin D with ultraviolet light of a wavelength of 253.7 mμ at a temperature of from about 50° to about 120° C.

5. The process of claim 4 wherein the ultraviolet light emanates from a low pressure mercury lamp.

6. The process of claim 4 wherein the solution comprises from about 0.01% to about 2% of provitamin D, by weight, and a solvent.

7. The process of claim 6 wherein the solvent has a dielectric constant of less than 20 DC at 20° C.

8. The process of claim 6 wherein the provitamin D is selected from the group consisting of ergosterol and 7-dehydrocholesterol.

9. The process of claim 6 wherein the solvent is selected from the group consisting of isooctane, isopropanol, benzene, toluene, o-xylene and p-xylene.

10. A process for the preparation of a mixture of vitamin D and previtamin D which process comprises irradiating a solution of provitamin D with ultraviolet light of a wavelength of 253.7 mμ at a temperature of from about 70° to about 90° C.

11. The process of claim 10 wherein the ultraviolet light emanates from a low pressure mercury lamp.

12. The process of claim 11 wheren the solution comprises from about 0.1% to about 0.5% of provitamin D, by weight, and a solvent.

13. The process of claim 10 wherein the solution comprises from about 0.01% to about 2% of provitamin D, by weight, and a solvent.

14. The process of claim 13 wherein the provitamin D is selected from the group consisting of ergosterol and 7-dehydrocholesterol.

15. The process of claim 13 wherein the solvent has a dielectric constant of less than 20 DC at 20° C.

16. The process of claim 13 wherein the solvent is selected from the group consisting of isooctane, isopropanol, benzene, toluene, o-xylene and p-xylene.

References Cited

UNITED STATES PATENTS

| | | | |
|---|---|---|---|
| 1,904,751 | 4/1933 | Reerink et al. | 204—159 |
| 1,980,971 | 11/1934 | Campsie | 204—159 |
| 2,099,550 | 11/1937 | Windaus et al. | 204—159 |
| 2,243,632 | 5/1941 | Johnson | 204—59 |

HOWARD S. WILLIAMS, Primary Examiner